S. Richardson.
Corn Sheller.

No. 35,625. Patented Jun. 17, 1862.

Witnesses.
Matt. G. Warner Jr.
Kirkland Holmes

Inventor.
Samuel Richardson

UNITED STATES PATENT OFFICE.

SAMUEL RICHARDSON, OF ROCHESTER, NEW YORK.

IMPROVEMENT IN CORN-SHELLERS.

Specification forming part of Letters Patent No. 35,625, dated June 17, 1862.

*To all whom it may concern:*

Be it known that I, SAMUEL RICHARDSON, of Rochester, in the county of Monroe and State of New York, have invented a new and useful Improvement in Corn-Shellers; and I do hereby declare that the following is a full, clear, and exact description thereof, reference being had to the accompanying drawings, making a part of this specification, in which—

Figure 1:
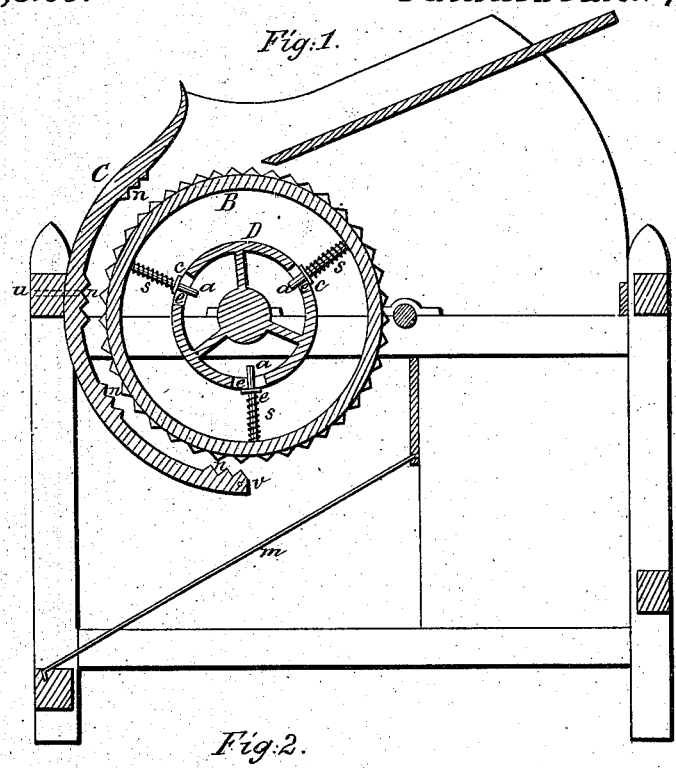
Figure 2:
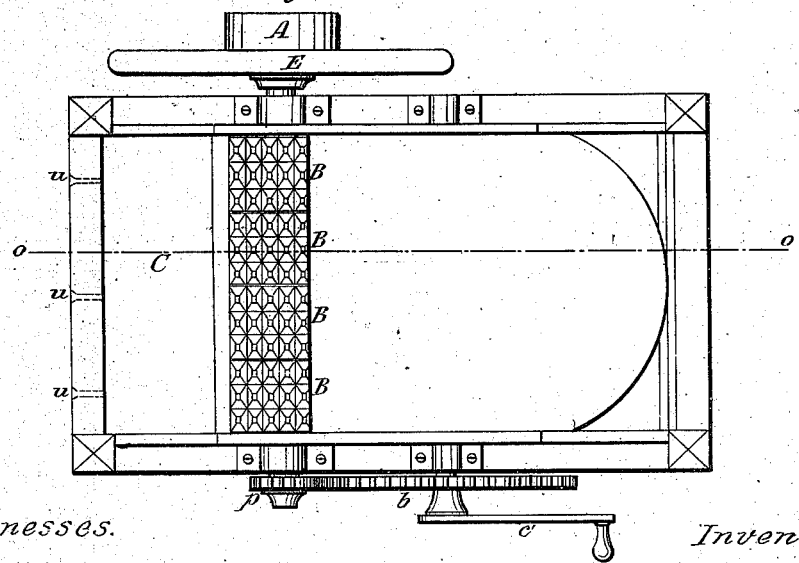

Figure 1 is a vertical section taken through the plane indicated by the red line *o*, in Fig. 2. Fig. 2 is a plan or top view of the machine.

Similar letters refer to corresponding parts in both figures.

The nature of this invention consists in the employment of an outer or secondary cylinder in corn-shellers, which is composed of a series of annular divisions, in combination with the primary or inner cylinder, to which each division is hung by means of guide-pins and springs in such a manner as to yield, and thereby adjust themselves to the passage through the machine of large or small ears, and to any inequalities of size in the same ears.

The cylinder and concave are mounted in a suitable frame, as shown in the drawings. The concave is made of iron, and describes nearly a semicircle, turning outward at the top or upper edge, so as to form an easy entrance for the ears, and is fixed to the frame of the machine by several screws or bolts, *u*, the lower end being held at the sides by a screw, *v*, which passes through the side of the machine into the concave. Said concave is provided with several ribs, *n*, which extend from side to side parallel with the axis of the cylinder, and are designed to arrest the ears and cause them to revolve more effectually as they pass through the machine.

The inner or primary cylinder, D, is made hollow, as shown in Fig. 1, with three mortises, *e*, through its periphery, for the pins *a* of each of the annular divisions B to pass through. Said mortises *e* are wide enough to receive the pins *a* freely, and their length (around the cylinder) should measure two or three times their width, in order to afford a lateral action to the annular sections B when necessary for the passage of large ears, &c. The pins *a* are fixed to the said sections B, and pass through the open spiral springs *s* and the washers *c*, the latter preventing the springs from following the pins through the mortises when the sections B are pressed in to make room for a large ear to pass, or for the large end of a tapering or conical ear.

The grain and cobs are separated by falling upon the oblique or inclined open screen *m*, the grain falling through and the cobs rolling off at the bottom.

The machine may be driven by hand by means of the crank *c'*, spur-wheel *b*, and pinion *p*; but it is designed more especially for a "power-machine," the pulley A being attached to the fly-wheel E for that purpose.

What I claim as my invention, and desire to secure by Letters Patent of the United States, is—

The employment, in corn-shellers, of a series of annular sections or divisions, B, (which form the outer cylinder,) in combination with the primary or inner cylinder, D, they being arranged and operating substantially in the manner herein specified.

SAMUEL RICHARDSON.

Witnesses:
MATT. G. WARREN, Jr.,
KNEELAND J. HOLMES.